United States Patent
Cha

(10) Patent No.: US 8,237,867 B2
(45) Date of Patent: Aug. 7, 2012

(54) DYNAMIC GAIN ADJUSTMENT METHOD BASED ON BRIGHTNESS AND APPARATUS THEREOF

(75) Inventor: Tae-hwan Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1480 days.

(21) Appl. No.: 11/730,643

(22) Filed: Apr. 3, 2007

(65) Prior Publication Data

US 2008/0024673 A1 Jan. 31, 2008

(30) Foreign Application Priority Data

Jul. 27, 2006 (KR) .................. 10-2006-0070905

(51) Int. Cl.
*H04N 5/57* (2006.01)
*H04N 5/52* (2006.01)

(52) U.S. Cl. ........ 348/678; 348/687; 348/673; 348/688; 348/255; 382/274; 382/272

(58) Field of Classification Search .......... 348/678, 348/687, 673, 688, 686, 255; 382/274, 275, 382/272; 358/447, 520, 3.27
See application file for complete search history.

(56) References Cited

U.S. PATENT DOCUMENTS

| | | | | |
|---|---|---|---|---|
| 4,015,076 A | * | 3/1977 | Ishiodori | 348/623 |
| 5,262,863 A | * | 11/1993 | Okada | 348/679 |
| 5,546,134 A | * | 8/1996 | Lee | 348/673 |
| 2002/0039152 A1 | * | 4/2002 | Choi | 348/678 |
| 2004/0257386 A1 | * | 12/2004 | Sagano et al. | 345/690 |
| 2005/0128358 A1 | | 6/2005 | Nakajima et al. | |

FOREIGN PATENT DOCUMENTS

| | | |
|---|---|---|
| CN | 1627791 A | 6/2005 |
| CN | 1661667 A | 8/2005 |
| EP | 1011264 A1 | 6/2000 |
| GB | 2411536 A | 8/2005 |
| WO | 02/37835 A2 | 5/2002 |
| WO | 2006/041049 A1 | 4/2006 |

OTHER PUBLICATIONS

First Office Action issued in counterpart Chinese Application No. 200710096365.9 dated Mar. 22, 2010.

* cited by examiner

*Primary Examiner* — Jefferey Harold
*Assistant Examiner* — Jean W Desir
(74) *Attorney, Agent, or Firm* — Sughrue Mion, PLLC

(57) ABSTRACT

A dynamic gain adjustment method and apparatus based on brightness are provided. The dynamic gain adjustment method and apparatus amplify or attenuate high frequency components of an input video signal by dynamically varying a gain that is applied to a peaking algorithm block for picture quality improvement in a video processing device, such as a digital television, based on an average picture level (APL) of the input video signal. The gain can be dynamically adjusted when the APL of the input video signal is high or low, and thus saturation of the video signal during the operation of the peaking block can be prevented.

9 Claims, 4 Drawing Sheets

DYNAMIC GAIN ADJUSTMENT METHOD BASED ON BRIGHTNESS AND APPARATUS THEREOF

CROSS-REFERENCE TO RELATED APPLICATIONS

This application claims priority from Korean Patent Application No. 10-2006-0070905, filed on Jul. 27, 2006 in the Korean Intellectual Property Office, the entire disclosure of which is hereby incorporated by reference.

BACKGROUND OF THE INVENTION

1. Field of the Invention

Apparatuses and methods consistent with the present invention relate to dynamic gain adjustment based on brightness, and more particularly, to dynamic gain adjustment based on brightness can amplify or attenuate high frequency components of an input video signal by dynamically varying a gain that is applied to a peaking algorithm block for picture quality improvement in a video processing device, such as a digital television (TV), based on an average picture level (APL) of the input video signal.

2. Description of the Related Art

A peaking algorithm block has been used in a video processing devices for the purpose of picture quality improvement.

FIG. 1 is a block diagram illustrating the construction of a related art peaking algorithm block.

The related art peaking algorithm block includes a high pass filter (HPF) 11, a coring unit 12, a gain unit 13, a mixer 14, and a limiter 15.

Based on this related art peaking algorithm block, the high pass filter 11 separates high frequency components from an input signal, and the coring unit 12 removes noise components from the high frequency components. The gain unit 13 then amplifies or attenuates the high frequency components applied from the coring unit 12, and the mixer 14 mixes the amplified or attenuated high frequency components with the input signal. The limiter 15 limits a peaked part of the mixed signal.

The related art peaking algorithm block has been used to improve the luminance frequency characteristic of an input video signal. High frequency components are extracted from the original signal through the high pass filter 11, the extracted high frequency components are amplified or attenuated through the gain unit 13, and then the amplified or attenuated high frequency components are mixed with the original signal through the mixer 14.

However, since this related art peaking algorithm block operates only based on the frequency, irrespective of the brightness of a video signal, the same gain value is continuously applied to the signal, irrespective of whether the brightness of the video signal is high or low. This may cause unwanted results, such as saturation of the video signal.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a dynamic gain adjustment method and apparatus based on brightness, which can dynamically vary a gain that is applied to a peaking algorithm block for picture quality improvement in a video processing device, such as a digital TV, based on an APL of a video signal.

According to an aspect of the present invention, there is provided a dynamic gain adjustment method based on brightness, which comprises calculating an APL value of an input video signal, calculating a dynamic gain coefficient based on the APL value, and amplifying or attenuating high frequency components separated from the input video signal by dynamically adjusting a gain value based on the dynamic gain coefficient.

The operation of calculating the APL value may comprise calculating the APL value of the input video signal in the unit of a frame.

The operation of calculating the dynamic gain coefficient may comprise calculating the dynamic gain coefficient such that the gain value decreases when the APL value is smaller than normal.

The operation of calculating the dynamic gain coefficient may comprise calculating the dynamic gain coefficient such that the gain value decreases when the APL value is larger than normal.

The operation of calculating the dynamic gain coefficient may comprise calculating the dynamic gain coefficient such that a preset gain value is used when the APL value is in a normal range.

According to another aspect of the present invention, there is provided a dynamic gain adjustment apparatus based on brightness, which comprises an APL analysis unit which calculates an APL value of an input video signal, a dynamic gain coefficient calculation unit which calculates a dynamic gain coefficient based on the APL value, and a gain unit which amplifies or attenuates high frequency components separated from the input video signal by dynamically adjusting a gain value based on the dynamic gain coefficient.

The APL analysis unit may calculate the APL value of the input video signal in the unit of a frame.

The dynamic gain coefficient calculation unit may calculate the dynamic gain coefficient such that the gain value decreases when the APL value is smaller than normal.

The dynamic gain coefficient calculation unit may calculate the dynamic gain coefficient such that the gain value decreases when the APL value is larger than normal.

The dynamic gain coefficient calculation unit may calculate the dynamic gain coefficient such that a preset gain value is used when the APL value is in a normal range.

BRIEF DESCRIPTION OF THE DRAWINGS

The above and other aspects of the present invention will become more apparent by describing certain exemplary embodiments of the present invention with reference to the accompanying drawings, in which.

Throughout the drawings, like reference numerals will be understood to refer to like parts, components, and structures.

DETAILED DESCRIPTION OF EXEMPLARY EMBODIMENTS OF THE INVENTION

The matters defined in the description, such as a detailed construction and elements, are provided to assist in a comprehensive understanding of embodiments of the invention, and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
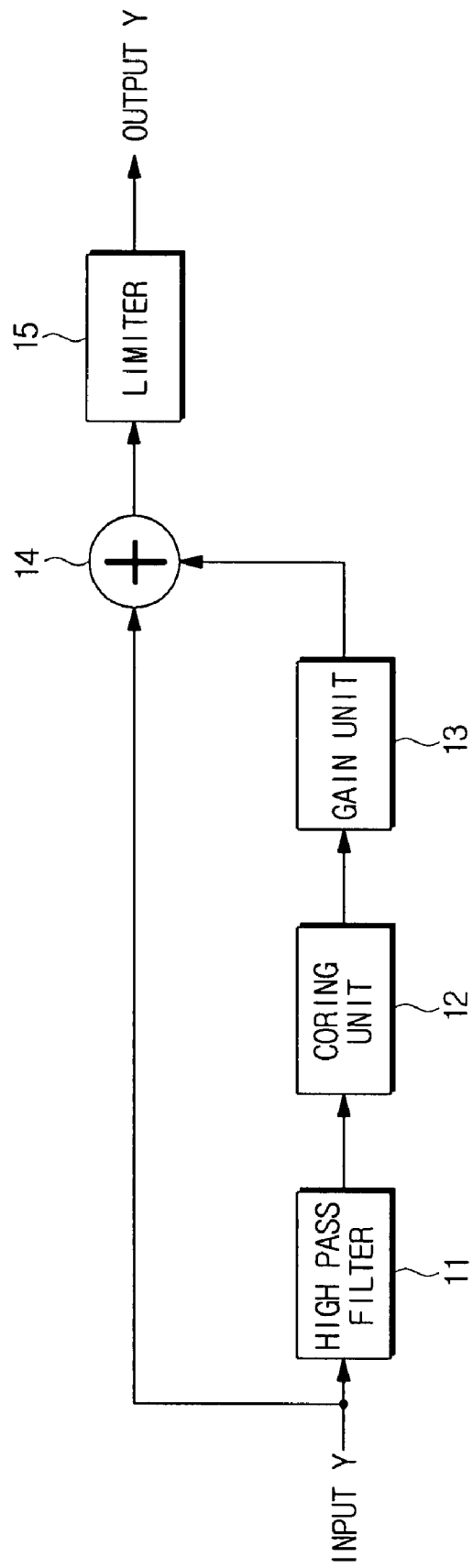
FIG. 1 is a block diagram illustrating the construction of a related art peaking algorithm block.
Figure 2:
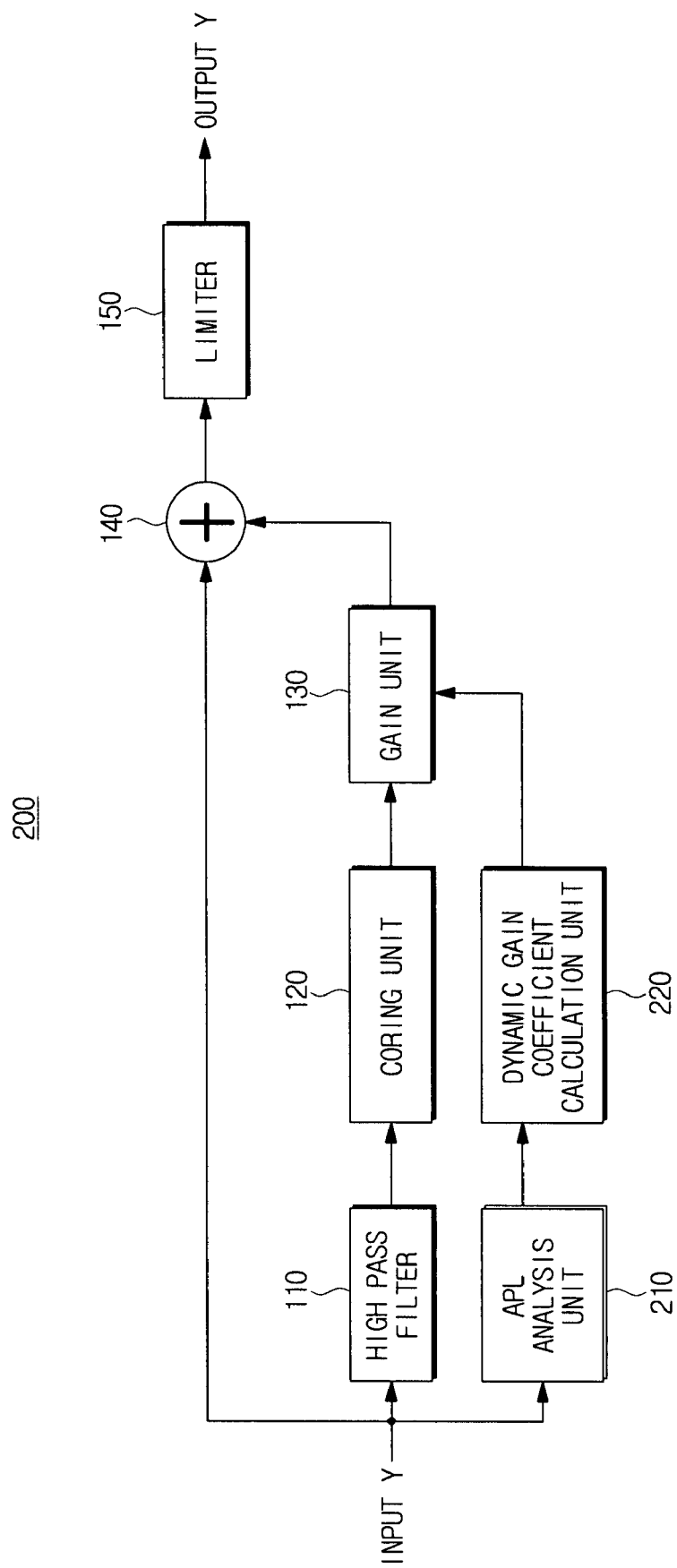
FIG. 2 is a block diagram illustrating the construction of a dynamic gain adjustment based on brightness according to an exemplary embodiment of the present invention.

FIG. 2 is a block diagram illustrating the construction of a dynamic gain adjustment based on brightness according to an exemplary embodiment of the present invention.

The dynamic gain adjustment apparatus 200 comprises an HPF 110, a coring unit 120, a gain unit 130, a mixer 140, a limiter 150, an APL analysis unit 210, and a dynamic gain coefficient calculation unit 220.

The HPF 110 separates high frequency components from an input video signal.

The coring unit 120 removes components which are less than a specified size from the high frequency components of the input video signal. The coring unit 120 is mainly used to remove noise.

The gain unit 130 amplifies or attenuates the high frequency components of the video signal applied from the coring unit 120.

The mixer 140 mixes the video signal, of which the high frequency components have been amplified or attenuated, with the input video signal.

The limiter 150 limits a peaked part of the mixed video signal.

The APL analysis unit 210 calculates an APL value of the input video signal in the unit of a frame. For example, if a frame is composed of 512 pixels, the APL analysis unit 210 calculates the APL value by summing up the picture values of the 512 pixels that constitute one frame, and then dividing the summed value by 512.

Figure 4:
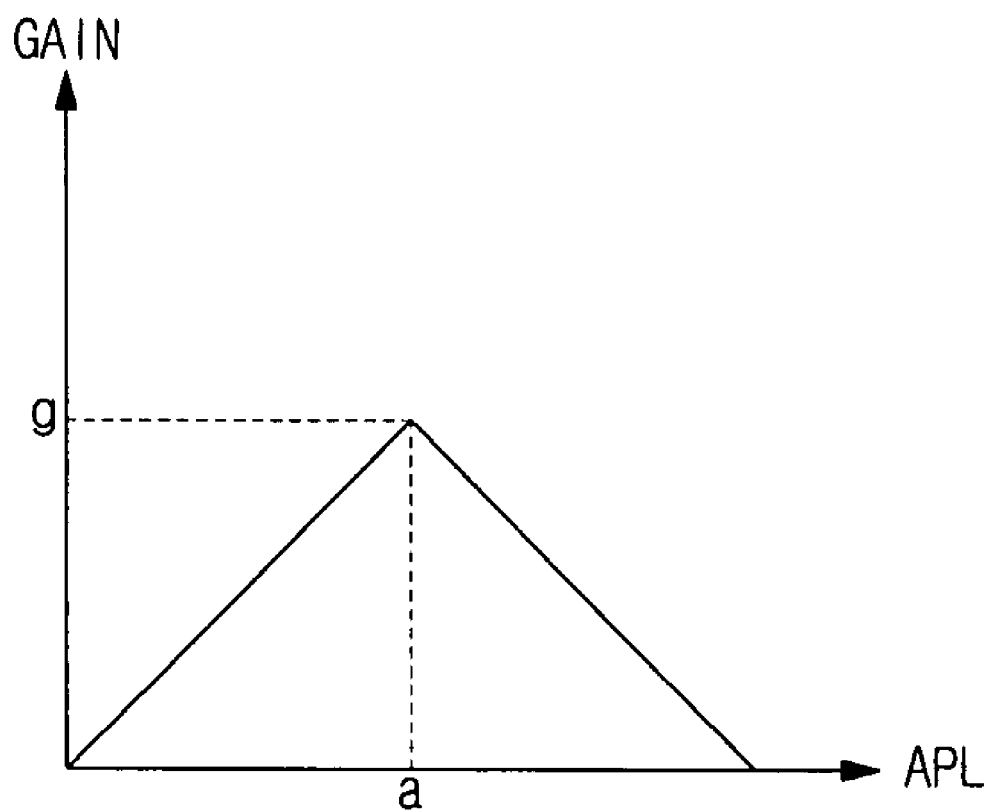
FIG. 4 is a graph showing a relationship between an APL value and a gain according to an exemplary embodiment of the present invention.

The dynamic gain coefficient calculation unit 220 calculates a gain coefficient having the characteristic as illustrated in FIG. 4, in accordance with the APL value applied from the APL analysis unit 210, and transfers the calculated gain coefficient to the gain unit 130.

It can be seen from FIG. 4 that the gain coefficient calculated by the dynamic gain coefficient calculation unit 220 has a very small value if the picture is very dark because the APL value is smaller than normal, or the picture is very bright because the APL value is larger than normal. Also, as illustrated in FIG. 4, if the picture has an APL value of 'a' and a gain of 'g', a preset gain coefficient is applied to the video signal without modification.

Figure 3:
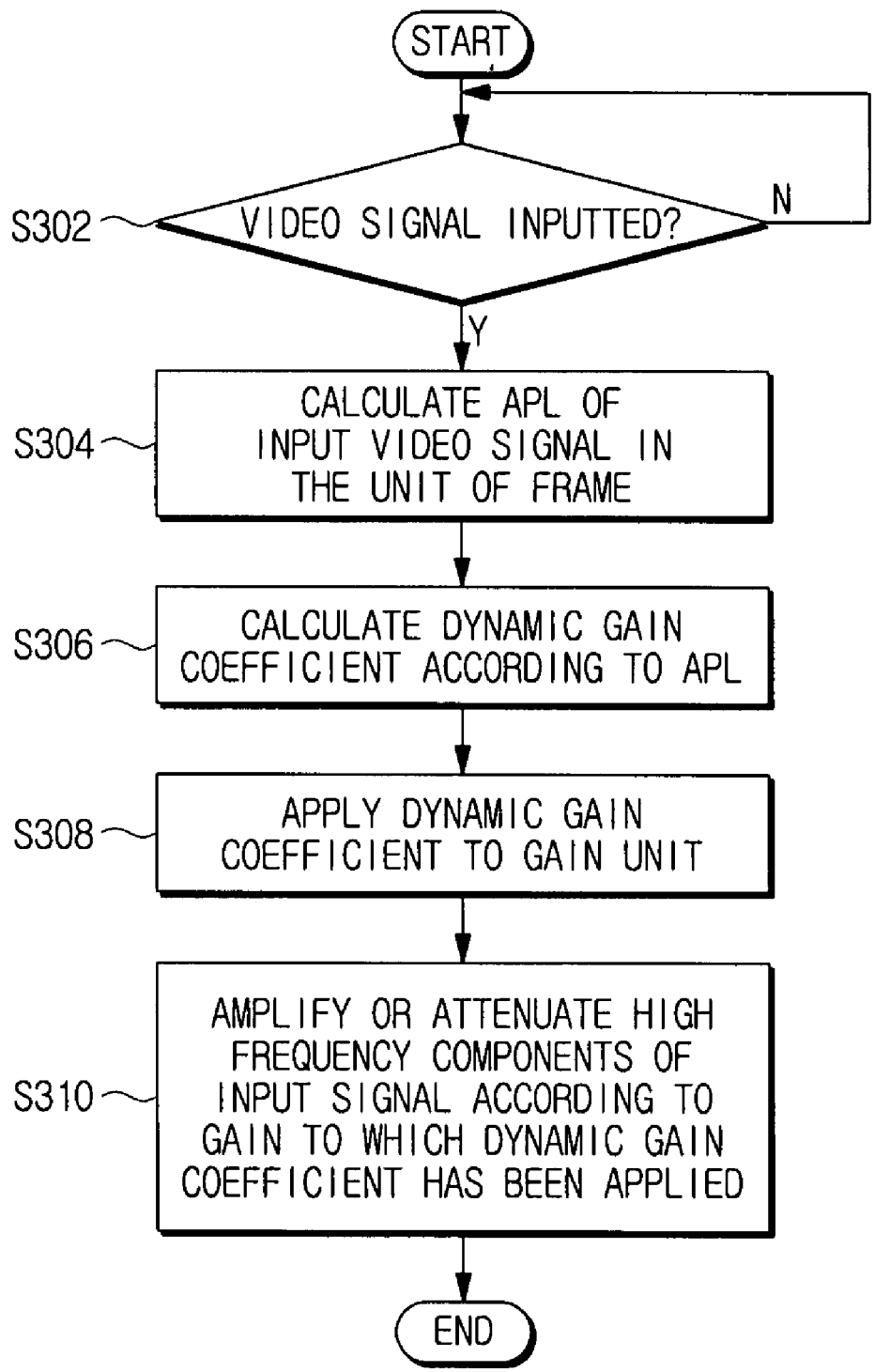
FIG. 3 is a flowchart illustrating a dynamic gain adjustment method based on brightness according to an exemplary embodiment of the present invention.

FIG. 3 is a flowchart illustrating a dynamic gain adjustment method based on brightness according to an exemplary embodiment of the present invention.

The dynamic gain adjustment apparatus can be applied to a digital TV that processes and outputs an input video signal. The dynamic gain adjustment apparatus can also be applied to all video processing devices that have peaking algorithm blocks.

In addition, the dynamic gain adjustment apparatus can be applied to a peaking algorithm block used for picture quality improvement when a video signal input to the digital TV is processed through a video decoder, a deinterlacer, or a scaler.

First, a video signal is inputted to a receiving unit of the dynamic gain adjustment apparatus according to an exemplary embodiment of the present invention (S302).

The input video signal is also applied to the HPF 110 and the APL analysis unit 210.

The APL analysis unit 210 calculates the APL of the input video signal in the unit of a frame, and transfers the calculated APL to the dynamic gain coefficient calculation unit 220 (S304).

For example, if a frame is composed of 1024×680 pixels, the APL analysis unit 210 calculates the APL value by summing up picture values of the respective pixels, and then dividing the summed value by 1024×680.

The dynamic gain coefficient calculation unit 220 calculates a dynamic gain coefficient having the characteristic as illustrated in FIG. 4, based on the APL value transferred from the APL analysis unit 210 (S306).

With reference to FIG. 4, the dynamic gain coefficient calculation unit 220 calculates a slope value 'α', based on which a gain value 'g' is calculated by the gain unit 130. Here, the slope value corresponds to the dynamic gain coefficient.

Specifically, the dynamic gain coefficient calculation unit 220 calculates the dynamic gain coefficient such that the gain value decreases when the APL value is smaller than a general APL value 'a', as shown in FIG. 4. In the same manner, the dynamic gain coefficient calculation unit 220 calculates the dynamic gain coefficient such that the gain value decreases when the APL value is larger than the general APL value 'a'.

Also, the dynamic gain coefficient calculation unit 220 calculates the dynamic gain coefficient such that a preset gain value 'g' is used when the APL value is within a range of normal APL values near 'a', as illustrated in FIG. 4.

The dynamic gain coefficient calculation unit 220 then transfers the calculated dynamic gain coefficient to the gain unit 130 (S308).

The HPF 110 separates high frequency components from the input video signal, and the coring unit 120 removes components which are less than a specified size from the high frequency components of the input video signal. The gain unit 130 amplifies or attenuates the high frequency components of the video signal applied from the coring unit 120 in accordance with the dynamic gain coefficient applied from the dynamic gain coefficient calculation unit 220.

The gain unit 130 amplifies or attenuates the high frequency components by adjusting the gain in accordance with the characteristic of FIG. 4, which is obtained through the dynamic gain coefficient applied from the dynamic gain coefficient calculation unit 220 (S310).

Accordingly, the dynamic gain adjustment apparatus can dynamically adjust the gain in both cases where the APL of the input video signal is high and low.

The dynamic gain adjustment apparatus 200, including the APL analysis unit 210 and the dynamic gain coefficient calculation unit 220, can be applied to the horizontal or vertical peaking of a video processing device provided with a peaking algorithm block. Also, the apparatus 200 can be applied to all integrated circuits (IC) using the peaking function in the video processing device, such as a TV.

Exemplary embodiments of the present invention can be written as codes, instructions, or programs, and can be implemented in general-use devices that execute the codes, instructions, or programs using a computer-readable recording medium. Examples of the computer-readable recording medium comprise magnetic storage media, such as ROM, floppy disks, and hard disks; optical recording media, such as CD-ROMs and DVDs; and storage media. The computer-readable recording medium can also be distributed over network coupled computer systems so that the computer-readable code is stored and executed in a distributed fashion. Also, functional programs, codes, and code segments for accomplishing exemplary embodiments of the present invention can be easily construed by programmers skilled in the art to which the present invention pertains.

As described above, according to the dynamic gain adjustment method and apparatus based on brightness, the high frequency components of an input video signal can be amplified or attenuated by dynamically varying the gain that is applied to the peaking algorithm block for picture quality improvement in a video processing device, such as a digital TV, based on the APL of the input video signal.

Accordingly, the gain can be dynamically adjusted when the APL of the input video signal is high or low, and saturation of the video signal during the operation of the peaking block can be prevented.

In addition, by applying the dynamic gain adjustment to all peaking blocks used for a picture quality improvement, a smooth peaking operation can be achieved through the gain adjustment based on the brightness.

The foregoing exemplary embodiments and advantages are merely exemplary and are not construed as limiting the present invention. The present teaching can be readily applied to other types of apparatuses. Also, the description of exemplary embodiments of the present invention is intended to be illustrative, and not to limit the scope of the claims. Many alternatives, modifications, and variations will be apparent to those skilled in the art.

What is claimed is:

1. A dynamic gain adjustment method based on brightness, the method comprising:
   calculating an average picture level (APL) value of an input video signal;
   calculating a dynamic gain coefficient based on the APL value; and
   amplifying or attenuating high frequency components separated from the input video signal by dynamically adjusting a gain value based on the dynamic gain coefficient,
   wherein the calculating the dynamic gain coefficient comprises calculating the dynamic gain coefficient such that the gain value decreases if the APL value is larger than a specified APL value.

2. The method of claim 1, wherein the calculating the APL value comprises calculating the APL value of the input video signal in a unit of a frame.

3. The method of claim 1, wherein the calculating the dynamic gain coefficient comprises calculating the dynamic gain coefficient such that the gain value decreases if the APL value is smaller than a specified APL value.

4. The method of claim 1, wherein the calculating the dynamic gain coefficient comprises calculating the dynamic gain coefficient such that a preset gain value is used if the APL value is within a specified range of APL values.

5. A dynamic gain adjustment apparatus based on brightness, the apparatus comprising:
   an average picture level (APL) analysis unit which calculates an APL value of an input video signal;
   a dynamic gain coefficient calculation unit which calculates a dynamic gain coefficient based on the APL value; and
   a gain unit which amplifies or attenuates high frequency components separated from the input video signal by dynamically adjusting a gain value based on the dynamic gain coefficient
   wherein the dynamic gain coefficient calculation unit calculates the dynamic gain coefficient such that the gain value decreases if the APL value is larger than a specified APL value.

6. The apparatus of claim 5, wherein the APL analysis unit calculates the APL value of the input video signal in a unit of a frame.

7. The apparatus of claim 5, wherein the dynamic gain coefficient calculation unit calculates the dynamic gain coefficient such that the gain value decreases if the APL value is smaller than a specified APL value.

8. The apparatus of claim 5, wherein the dynamic gain coefficient calculation unit calculates the dynamic gain coefficient such that a preset gain value is used if the APL value is within a specified range of APL values.

9. The apparatus of claim 5, further comprising:
   a high pass filter which separates high frequency components from the input video signal;
   a coring unit which removes noise components from the high frequency components of the input video signal;
   a mixer which mixes a video signal, of which the high frequency components have been amplified or attenuated, with the input video signal; and
   a limiter which limits a peaked part of the mixed video signal.

* * * * *